US012386724B2

(12) United States Patent
Wilmes et al.

(10) Patent No.: US 12,386,724 B2
(45) Date of Patent: Aug. 12, 2025

(54) METHOD FOR ASSESSING A SOFTWARE FOR A CONTROL UNIT OF A VEHICLE

(71) Applicant: Robert Bosch GmbH, Stuttgart (DE)

(72) Inventors: Dora Wilmes, Stuttgart (DE); Marina Ullmann, Gerlingen (DE); Matthias Birk, Heimsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 163 days.

(21) Appl. No.: 18/546,544

(22) PCT Filed: Feb. 3, 2022

(86) PCT No.: PCT/EP2022/052522
§ 371 (c)(1),
(2) Date: Aug. 15, 2023

(87) PCT Pub. No.: WO2022/199916
PCT Pub. Date: Sep. 29, 2022

(65) Prior Publication Data
US 2024/0184686 A1    Jun. 6, 2024

(30) Foreign Application Priority Data
Mar. 24, 2021    (DE) ............... 10 2021 202 903.5

(51) Int. Cl.
*G06F 9/44* (2018.01)
*G06F 11/3604* (2025.01)
(Continued)

(52) U.S. Cl.
CPC .......... *G06F 11/3608* (2013.01); *G07C 5/008* (2013.01); *G07C 5/0808* (2013.01)

(58) Field of Classification Search
CPC .... G06F 11/3608; G07C 5/008; G07C 5/0808
See application file for complete search history.

(56) References Cited

U.S. PATENT DOCUMENTS

| 8,856,743 B2 * | 10/2014 | Sweis | ................. G06F 11/3608 |
| | | | 717/124 |
| 2018/0267538 A1 * | 9/2018 | Shum | .................... B60W 30/09 |

(Continued)

FOREIGN PATENT DOCUMENTS

| JP | 2008117082 A | 5/2008 |
| JP | 2009276906 A | 11/2009 |

(Continued)

OTHER PUBLICATIONS

International Search Report for PCT/EP2022/052522, Issued Jun. 3, 2022.

*Primary Examiner* — Qamrun Nahar
(74) *Attorney, Agent, or Firm* — NORTON ROSE FULBRIGHT US LLP

(57) ABSTRACT

A method for assessing a software for a control unit of a vehicle. The control unit includes a memory storing first and second versions of the software, and a processor. The method includes: receiving, in the control unit, sensor data generated by a sensor system for sensing an area surrounding the vehicle; inputting the sensor data into the first and second versions; generating first object data from the sensor data by the first version, the first object data including positions and/or orientations of first objects; generating second object data from the sensor data by the second version, the second object data including positions and/or orientations of second objects; assessing the second version in terms of a detection quality by comparing the first object data to the second object data, whereby an assessment result is produced; and transmitting the assessment result from the control unit to a central data-processing device.

12 Claims, 2 Drawing Sheets

(51) Int. Cl.
  *G07C 5/00*    (2006.01)
  *G07C 5/08*    (2006.01)

(56) References Cited

U.S. PATENT DOCUMENTS

| | | | | |
|---|---|---|---|---|
| 2018/0341571 | A1* | 11/2018 | Kislovskiy | G06F 11/3604 |
| 2020/0158780 | A1* | 5/2020 | Ranganathan | G06F 11/3676 |
| 2021/0026760 | A1* | 1/2021 | Huth | G06F 11/3608 |
| 2021/0326236 | A1* | 10/2021 | Monteith | G06F 11/3608 |

FOREIGN PATENT DOCUMENTS

| | | |
|---|---|---|
| JP | 2019032656 A | 2/2019 |
| JP | 2020013480 A | 1/2020 |
| JP | 2021012446 A | 2/2021 |

\* cited by examiner

METHOD FOR ASSESSING A SOFTWARE FOR A CONTROL UNIT OF A VEHICLE

FIELD

The present invention relates to a method for assessing a software for a control unit of a vehicle. The present invention also relates to a control unit, a computer program and a machine-readable medium for carrying out the aforesaid method.

BACKGROUND INFORMATION

A vehicle such as an automobile or a truck, for example, may be equipped with a driver-assistance system that permits semi-automated or fully-automated control of the vehicle. To this end, utilizing a suitable sensor system, for instance, the driver-assistance system is able to detect positions, orientations and/or types of objects in the area surrounding the vehicle, and to steer, brake and/or accelerate the vehicle, taking these objects into consideration.

Such a driver-assistance system is generally subject to stringent safety requirements. Updates of the driver-assistance system, for instance, to improve or expand the driver-assistance system, may be very costly, since with each update of individual components, the entire system must be approved.

SUMMARY

The approach presented here according to the present invention provides a method for assessing a software for a control unit of a vehicle, a corresponding control unit, a corresponding computer program and a corresponding machine-readable medium. Advantageous developments of and improvements to the approach presented here are derived from the disclosure herein.

Specific example embodiments of the present invention make it possible to run a not-yet released version of an object-detection software for a control unit of a vehicle concurrently with an already-released version of the object-detection software on the control unit, to assess the not-yet released version in terms of its detection quality by comparing detection results of the two versions, and to transmit a corresponding assessment result to a central data-processing device for further evaluation.

Thus, taking into account assessment results, i.e., real data, of a suitably large number of series vehicles, a very rapid and cost-effective validation of the version not yet released, e.g., a new version of an object-detection module or sensor-data-fusion model may be ensured.

A first aspect of the present invention relates to a computer-implemented method for assessing a software for a control unit of a vehicle. In this context, the control unit includes a memory in which a first version and a second version of the software are stored, as well as a processor for running the first version and the second version. According to an example embodiment of the present invention, the method includes at least the following steps: Receiving of sensor data, which were generated by a sensor system for sensing an area surrounding the vehicle, in the control unit; inputting the sensor data into the first version and the second version; generating of first object data from the sensor data by the first version, the first object data including positions and/or orientations of first objects, detected by the first version, in the area surrounding the vehicle; generating of second object data from the sensor data by the second version, the second object data including positions and/or orientations of second objects, detected by the second version, in the area surrounding the vehicle; assessing the second version in terms of a detection quality by comparing the first object data to the second object data, whereby an assessment result is produced; and transmitting the assessment result from the control unit to a central data-processing device.

For example, the method may be carried out automatically by the processor of the control unit. For instance, the method may be carried out when a command, generated by the central data-processing device, to carry out the method is received in the control unit.

The vehicle may be a motor vehicle, for instance, in the form of an automobile, truck, bus or a motorcycle. In a broader sense, a vehicle may also be understood to be an autonomous, mobile robot.

The sensor system may include at least one driving-environment sensor such as a camera, a radar sensor, lidar sensor or ultrasonic sensor. Moreover, the sensor system may include a locating sensor for determining geographic coordinates of the vehicle with the aid of a global navigation satellite system such as GPS, GLONASS or the like. In addition, the sensor system may include at least one driving-dynamics sensor such as an acceleration sensor, wheel-speed sensor, steering-wheel-angle sensor, steering-torque sensor, brake-pressure sensor or brake-pedal-travel sensor for detecting a driving state of the vehicle.

By processing the sensor data in the control unit, it is possible to detect objects such as other road users, lane markings, traffic signs, signaling systems, buildings or vegetation located in the area surrounding the vehicle. In doing so, positions and/or orientations of the objects relative to the vehicle may be determined in multiple successive time steps and stored in the form of an object list in a surroundings model. It is possible that in each instantaneous time step, future positions and/or orientations of the objects are estimated from their positions and/or orientations in one or more earlier time steps.

The sensor data may be received in multiple successive time steps, the sensor data in each time step being able to be input both into the first version and into the second version.

It is possible that the software of the control unit is configured to steer, to accelerate and/or to brake the vehicle based on the sensor data. To that end, the vehicle may include a suitable actuator system, for example, in the form of a steering actuator, a brake actuator, an engine control unit, an electric drive motor or a combination of at least two of the indicated examples. The software of the control unit may include one or more components of a driver-assistance system.

For example, the central data-processing device may be a server, a PC, a laptop, a tablet or a smart phone.

The control unit and the central data-processing device may be connected to each other via a wireless data-communication link such as WLAN, Bluetooth and/or cellular network. However, a cabled data-communication link between the control unit and the central data-processing device is also possible.

According to an example embodiment of the present invention, in addition, the method may include the following steps: Receiving of the second version in the control unit; storing of the second version in the memory of the control unit. In this context, the second version may have been produced by the central data-processing device and/or transmitted from the central data-processing device to the control unit. For instance, the second version may be received in the form of a data file, executable by the processor, in the control unit and stored there.

The first version may be an older version of the software already released. The second version may be a newer version of the software not yet released.

For example, the second version may include an updated version of one or more software modules of the first version, such as a detection module or sensor-data-fusion module for detecting the objects in the sensor data, or an interpretation module for interpreting the objects with respect to their relevance for the vehicle.

It is possible that the first version includes a first detection module for converting the sensor data into the first object data and/or a first interpretation module for determining objects relevant for the vehicle based on the first object data and/or the sensor data. The first detection module and/or the first interpretation module may be an already released software module of the software.

Analogously, it is possible that the second version includes a second detection module for converting the sensor data into the second object data and/or a second interpretation module for determining objects relevant for the vehicle based on the second object data and/or the sensor data. The second detection module or the second interpretation module may be a not yet released software module of the software.

For example, the first version and the second version may be run in parallel processes by the processor of the control unit.

In so doing, the second version may be run in an isolated area, within which the second version may be run without safety-related effects on hardware and software components of the vehicle located outside of this area, for instance, effects on the first version or on an actuator system of the vehicle.

Software which is run in such an isolated area may also be referred to as shadow mode software.

In other words, the first version and the second version may be run in different operating environments. In so doing, the second version may be run in an operating environment that is restricted compared to the operating environment of the first version.

For example, according to an example embodiment of the present invention, in addition to the positions and/or orientations of the first objects, the first object data may include object classes of the first objects. Alternatively or furthermore, in addition to the positions and/or orientations of the second objects, the second object data may include object classes of the second objects. For instance, an object class may be an object type such as an "oncoming vehicle", "preceding vehicle", "lane marking", "pedestrian" or the like. The object classes may be assigned to the first or second objects by evaluating the sensor data with the aid of one or more classifiers. More than one object class may also be assigned to one and the same object.

To assess the second version in terms of the detection quality, the first object data and the second object data may be compared to each other, for example, by comparing the positions and/or orientations of the first objects to the positions and/or orientations of the second objects and/or by comparing the detection moments at which the first objects were detected, to detection moments at which the second objects were detected. However, other comparison methods are possible, as well.

To this end, links may be determined between one first object and one second object, respectively. In so doing, the positions and/or orientations and/or the detection moments of the interlinked objects may be compared to each other. The linked-together objects may be object models which describe one and the same actual object in the area surrounding the vehicle.

By assessing the second version, it is possible to determine whether its detection quality, that is, the detection accuracy and reliability with which objects are detected by the second version, is worse than or at least just as good as the detection quality of the first version.

For instance, according to an example embodiment of the present invention, the assessment result may include statistical estimated values for the detection accuracy and reliability of the second version, viewed absolutely and/or in relation to the first version. Additionally or alternatively, the assessment result may include data sequences, relevant for the assessment of the second version in terms of the detection quality, from the first and/or second object data and/or the sensor data. By transmitting the data sequences to the central data-processing device, for example, via a wireless data-communication link, the data sequences may be evaluated at a central location regardless of the whereabouts of the vehicle.

For example, according to an example embodiment of the present invention, such a data sequence may include an object list having objects relevant for the assessment of the second version in terms of the detection quality and/or the (raw) sensor data underlying these objects.

For example, according to an example embodiment of the present invention, the second version may be assessed as worse than the first version in terms of the detection quality if it is determined that an object which was detected by the first version was not detected by the second version.

Conversely, it is possible that the second version is assessed as better than the first version in terms of the detection quality if it is determined that an object which was detected by the second version was not detected by the first version.

In this context, it is expedient if objects relevant for the vehicle and objects not relevant for the vehicle are differentiated. For instance, an object may be recognized as relevant or not relevant for the vehicle depending on its distance and/or its speed relative to the vehicle and/or depending on its object class.

The approach described here and in the following is based on the fact that to assist in the development of driver-assistance systems, software may be run in what is referred to as shadow mode in series vehicles. In so doing, the software or individual software modules run(s) passively in an isolated area without effect on active components in the vehicle. For instance, in this area, newly developed software versions may be uploaded in rapid iterations and evaluated. For that purpose, an assessment framework may be used, for example, which, based on defined trigger logics, triggers the recording of data sequences and ensures the wireless data transmission to a cloud. Thus, newly developed software versions may be compared very quickly to a large volume of data, which corresponds to a realistic happening in the field, and assessed.

In the method according to one specific embodiment of the first aspect of the present invention, such a shadow mode may now be utilized to determine whether an updated version of a software for a control unit of a vehicle achieves certain target parameters just as well or better than a version of this software already released, which is active in the vehicle. To that end, results of the updated version running in shadow mode in the vehicle may be compared directly to results of the version already released. This has the advantage that updates of software modules, for instance, of a driver-assistance system, can be released with substantially less expenditure in comparison to current release methods, and therefore are able to be provided considerably more frequently.

It should be pointed out that to carry out the method explained above and in the following, it is not absolutely necessary to run the first and second version of the software in one and the same control unit. Instead, the two versions may also be run on different control units possibly networked with each other, as described in the following.

It is possible that the first version is run by a first control unit and the second version is run by a second control unit. In addition to the second version, the second control unit may run the (released) first version or another released version of the software.

For example, the first control unit may be the control unit of a first vehicle. For example, the second control unit may be the control unit of a second vehicle. The first control unit and the second control unit may be connected to each other for the communication of data, e.g., via a wireless data-communication link.

For instance, the first object data may be generated from first sensor data by the first control unit, the first sensor data having been able to be generated by a first sensor system for sensing an area surrounding the first vehicle.

For instance, the second object data may be generated from second sensor data by the second control unit, the second sensor data having been able to be generated by a second sensor system for sensing an area surrounding the second vehicle.

It is possible that the first control unit receives the second object data from the second control unit.

Accordingly, the assessment result may be produced, for example, by the first control unit, by comparing the first object data to the second object data received from the second control unit. In this context, the assessment result may be transmitted from the first control unit to the central data-processing device and, additionally, to the second control unit.

A second aspect of the present invention relates to a control unit, including a processor which is configured to carry out the method according to one specific embodiment of the first aspect of the present invention. Features of the method according to one specific embodiment of the first aspect of the present invention may also be features of the control unit and vice versa.

The control unit may include hardware modules and/or software modules. In addition to the processor, the control unit may include a memory and data-communication interfaces for data communication with peripherals.

A third aspect of the present invention relates to a computer program. The computer program includes commands which, upon execution of the computer program by a processor, prompt the processor to carry out the method according to one specific embodiment of the first aspect of the present invention.

A fourth aspect of the present invention relates to a machine-readable medium on which the computer program according to one specific embodiment of the third aspect of the present invention is stored. The machine-readable medium may be a volatile or non-volatile data memory. For example, the machine-readable medium may be a hard disk, a USB storage device, a RAM, ROM, EPROM or flash memory. The machine-readable medium may also be a data-communication network such as the Internet or a cloud permitting a download of a program code.

Features of the method according to one specific embodiment of the first aspect of the present invention may also be features of the computer program and/or of the machine-readable medium and vice versa.

Ideas with respect to specific embodiments of the present invention may be regarded, inter alia, as based on the thoughts and findings described in the following.

According to one specific example embodiment of the present invention, for each first object, at least one first assessment parameter is determined which indicates how well the first object was detected by the first version. At the same time, for each second object, at least one second assessment parameter is determined which indicates how well the second object was detected by the second version. The second version is then assessed by comparing the first assessment parameters to the second assessment parameters. For example, a first or second assessment parameter may be a detection moment or a statistical value, e.g., a confidence with respect to the detected positions and/or orientations. The second version may be assessed by comparing the first assessment parameters and second assessment parameters of identical objects. In other words, a first object may be assessed with a second object matching up with the first object, by comparing the first assessment parameter(s) assigned to the first object to the second assessment parameter(s) assigned to the second object. For instance, to compare the first version to the second version, a difference may be formed from the first assessment parameter(s) and the corresponding second assessment parameter(s), the second version being able to be assessed based on the difference. Consequently, an assessment of the software is made possible based on individual detected objects.

According to one specific example embodiment of the present invention, the first assessment parameter is a detection moment at which the first object was detected by the first version. Additionally or alternatively, the second assessment parameter may be a detection moment at which the second object was detected by the second version. For example, the second version may be assessed as better than the first version in terms of detection quality if the detection moment at which an object was detected by the second version is an earlier point in time than the detection moment at which the same object was detected by the first version, and vice versa. Such a comparison of the detection moments is easy to carry out and supplies a sufficiently accurate assessment result.

According to one specific example embodiment of the present invention, the first assessment parameter is a probability with respect to the position and/or orientation of the first object. Additionally or alternatively, the second assessment parameter may be a probability with respect to the position and/or orientation of the second object. For example, the precision of the positions and/or orientations, more exactly, the precision of a position parameter relative to a probability distribution of the positions and/or orientations, may be indicated with the probability. For instance, the first or second assessment parameter may be a position parameter and/or scatter parameter of a probability distribution. It is also possible that the first or second assessment parameter indicates a confidence interval. The accuracy and reliability of the method may thus be increased.

According to one specific example embodiment of the present invention, first objects relevant for the vehicle are selected from the first objects by the first version. In this context, objects matching up with each other are determined by comparing the relevant first objects to the second objects. The assessment parameters of the objects matching up with each other are then compared to each other. As already mentioned above, a relevant first object may be selected from the first objects depending, for example, on its distance and/or its speed relative to the vehicle and/or depending on its object class. This may be carried out with the aid of the first interpretation module of the first version, which may be configured to determine the relevance of the first objects depending on situation and/or function, e.g., by dividing the first objects into various relevance categories, in the simplest case, for instance, into the relevance categories "relevant" and "not relevant". In this way, it is possible to determine whether the second version even detects the objects recognized as relevant by the (validated or released) first version. If this is determined, then this may be judged to be a strong indication that the detection quality of the second version is at least not worse than the detection quality of the first version.

According to one specific example embodiment of the present invention, second objects relevant for the vehicle are selected by the second version from the second objects which do not match up with any relevant first object. In this instance, for each relevant second object, an individual assessment is produced which indicates whether the detection of the relevant second object by the second version reflects an improvement or worsening of the detection quality of the second version compared to the first version. The second version is then further assessed based on the individual assessments. To that end, first of all it may be determined whether the second object data include second objects which do not match up with any of the relevant first objects, that is, were not detected or at least were not recognized as relevant by the first version. Additionally, it may be determined whether the second objects which do not match up with any of the relevant first objects are or are not relevant for the vehicle. As already mentioned above, this may be accomplished with the aid of the second interpretation module of the second version, which—analogous to the first interpretation module—may be configured to determine the relevance of the second objects depending on situation and/or function, e.g., by dividing the second objects into various relevance categories, in the simplest case, for instance, into the relevance categories "relevant" and "not relevant".

For example, according to an example embodiment of the present invention, the individual assessments may be transmitted as part of the assessment result to the central data-processing device.

Additionally or alternatively, the assessment result may include the object data and/or sensor data underlying the respective individual assessments. It is possible that the object data and/or sensor data are transmitted as part of the assessment result only when the individual assessments which are based on the object data and/or the sensor data indicate a worsening of the detection quality of the second version relative to the first version.

Through this specific embodiment, the second version may be assessed depending on whether the second version detects relevant objects that were not already detected by the first version. For instance, the assessment of the second version may be recalculated with each individual assessment.

According to one specific example embodiment of the present invention, based on the sensor data and/or on driving-dynamics data which were generated by at least one driving-dynamics sensor of the vehicle, changes in a driving state of the vehicle are determined which correlate timewise with detection moments at which the relevant second objects were detected by the second version. In this instance, each individual assessment is produced by evaluating the change in the driving state correlating timewise with the respective relevant second object. To determine whether the detection of the relevant second objects, which were not recognized (as relevant) by the first version, actually reflects an improvement of the detection quality of the second version compared to the first version, the sensor data and/or the driving-dynamics data may be evaluated, for example, to determine a reaction of a driver of the vehicle at the moment the object in question was detected and to interpret it. For instance, if no or at least no relevant reaction of the driver is ascertainable, then this may be judged as a strong indication that with the detection of the object in question, the detection quality was not appreciably improved, and vice versa.

According to one specific example embodiment of the present invention, the second object data are generated in multiple successive time steps. In the process, the second objects are checked for plausibility by comparisons between the second object data from different time steps. The second version is then further assessed depending on the plausibility of the second objects. For example, the positions and/or orientations of one and the same object from different time steps may be compared to each other in order to ascertain inconsistencies, that is, implausible changes of the position and/or orientation of the object. It may thereby be determined whether the second version supplies object data that are consistent and plausible over time. It is possible that object data with respect to individual implausible objects, for instance, their positions and/or orientations over multiple successive time steps, are transmitted as part of the assessment result to the central data-processing device.

According to one specific embodiment of the present invention, the assessment result includes data sequences from the sensor data, from the first object data and/or from the second object data. The assessment of the second version may be based on the data sequences. In other words, the data sequences may indicate an improvement or worsening of the detection quality of the second version compared to the first version. The transmitting of these data sequences permits a targeted external evaluation of the second version in terms of its detection quality.

According to one specific embodiment of the present invention, the data sequences are only transmitted if the second version was assessed to be worse than the first version in terms of the detection quality. The efficiency of the data communication between the control unit and the central data-processing device may thus be improved.

BRIEF DESCRIPTION OF THE DRAWINGS

Specific embodiments of the present invention are described hereinafter with reference to the figures, neither the figures nor the description to be interpreted as restrictive of the present invention.

The figures are merely schematic and not true to scale. Identical reference numerals denote features in the figures that are identical or exercise essentially similar effects.

DETAILED DESCRIPTION OF EXAMPLE EMBODIMENTS

Figure 1:
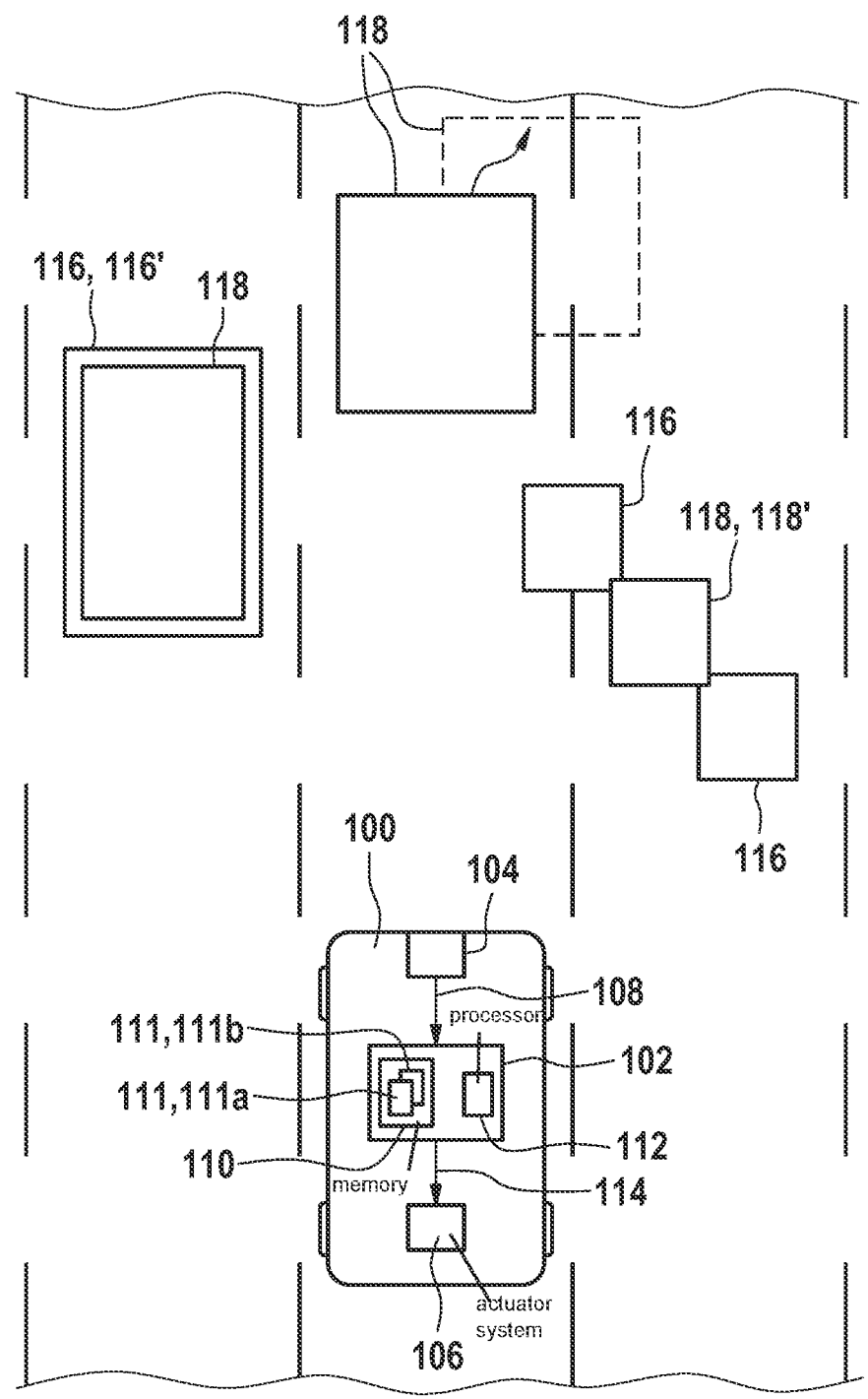
FIG. 1 shows a vehicle having a control unit according to an exemplary embodiment of the present invention.

FIG. 1 shows a vehicle 100 which is equipped with a control unit 102, a sensor system 104 for sensing an area surrounding vehicle 100 and an actuator system 106.

For example, sensor system 104 may include a camera, a radar sensor, lidar sensor and/or ultrasonic sensor. In addition, sensor system 104 may include at least one driving-dynamics sensor, for instance, an acceleration sensor or yaw rate sensor. Sensor system 104 generates sensor data 108 in multiple successive time steps, the sensor data being received in control unit 102 and being evaluated there as part of an object detection. Control unit 102 includes a memory 110 in which a suitable software 111 is stored, as well as a processor 112 for running software 111.

It is possible that control unit 102, based on sensor data 108, that is, based on results of the object detection thereby carried out, generates a control signal 114 for the automatic control of actuator system 106. For instance, actuator system 106 may include one or more steering and/or brake actuators for steering and braking vehicle 100.

Two different versions 111a, 111b of software 111 run simultaneously on control unit 102, sensor data 108 being input into each version. In this context, first objects 116 in the area surrounding vehicle 100 are detected through evaluation of sensor data 108 by a first version 111a of software 111, while second objects 118 in the area surrounding vehicle 100 are detected through evaluation of sensor data 108 by a second version 111b of software 111. First objects 116 and second objects 118, here preceding vehicles as an example, may be identical or different objects. By comparing first objects 116 to second objects 118, control unit 102 is able to assess a detection quality of second version 111b as against first version 111a. This is described in greater detail below with the aid of FIG. 2.

Figure 2:
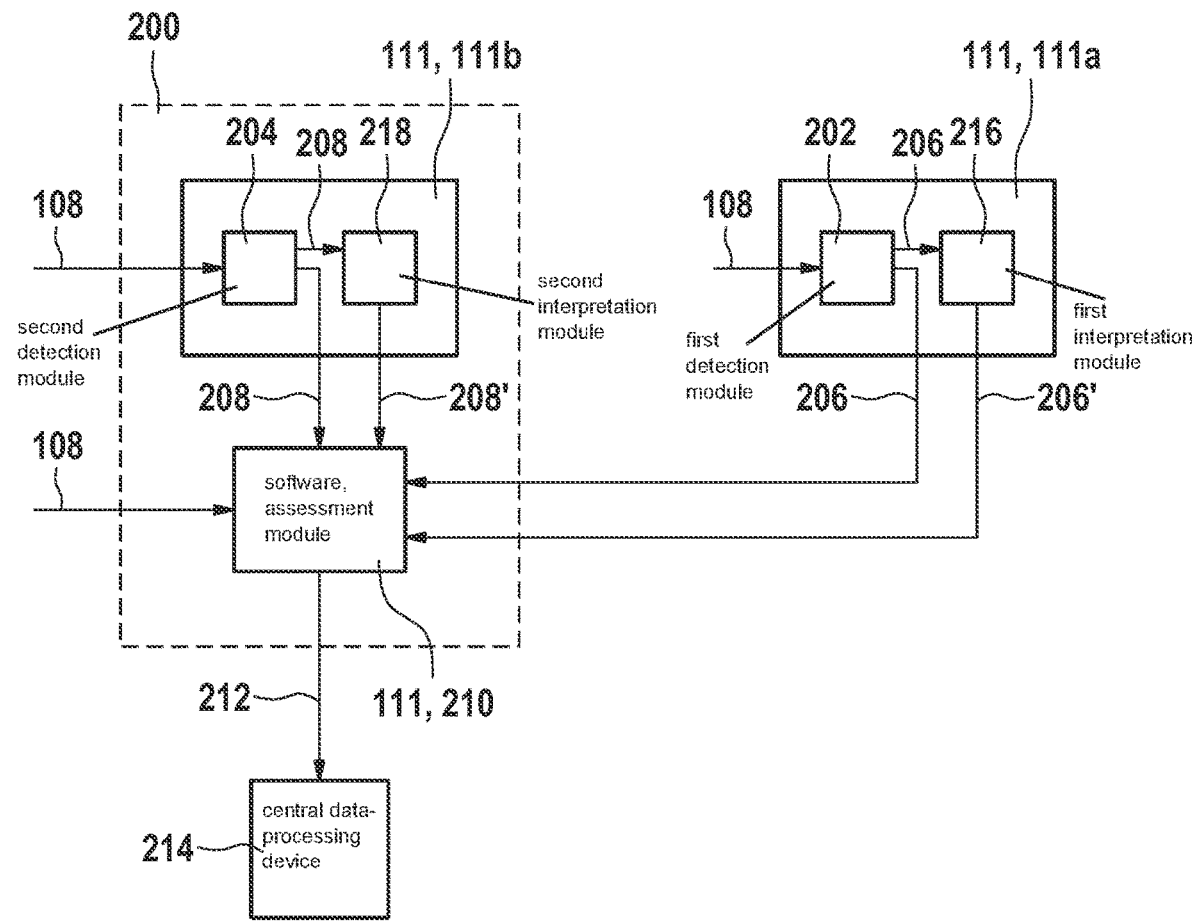
FIG. 2 shows various modules of a software which runs on the control unit from FIG. 1, according to an example embodiment of the present invention.

FIG. 2 shows a block diagram of software 111 running on control unit 102. In this example, first version 111a is an already validated or released, i.e., active version of software 111, while second version 111b is a version of software 111 not yet validated or not yet released which, in contrast to first version 111a, may run in a restricted operating environment 200 of control unit 102, that is, may run passively together with first version 111a in a test area shielded from components outside of restricted operating environment 200. Second version 111b may be an update of first version 111a, for instance, a version of software 111 that is improved and/or expanded compared to first version 111a. Second version 111b may also be referred to as shadow software.

Alternatively, second version 111b may also be allocated in the same way to a separate control unit.

In this example, sensor data 108 go both into a first detection module 202 of first version 111a and into a second detection module 204 of second version 111b. From sensor data 108, first detection module 202 generates first object data 206, which include positions and/or orientations of first objects 116 relative to vehicle 100. At the same time, from sensor data 108, second detection module 204 generates second object data 208, which include positions and/or orientations of second objects 118 relative to vehicle 100.

For example, detected objects 116, 118 may be stored together with their respective positions and/or orientations in the form of object lists in a surroundings model of the area surrounding vehicle 100, and may be updated continuously there based on sensor data 108. In this connection, first objects 116 and second objects 118 may be regarded as object models, stored in the surroundings model, of objects actually present in the area surrounding vehicle 100.

In addition to the respective positions and/or orientations, first object data 206 and/or second object data 208 may specify one or more object types for each detected object 116 and 118, respectively, such as "vehicle", "pedestrian" or "lane marking", for example.

First object data 206 and second object data 208 are input into an assessment module 210 of software 111, which in this example, like second version 111b, runs in restricted operating environment 200 for safety reasons. Assessment module 210 assesses the detection quality of second version 111b in relation to first version 111a, by comparing first object data 206 to second object data 208 in suitable manner. In so doing, assessment module 210 generates a corresponding assessment result 212 and transmits it, e.g., via a WLAN, Bluetooth and/or cellular connection, to a central data-processing device 214 outside of vehicle 100 for further evaluation.

Within the framework of this assessment, first objects 116 may be compared to corresponding second objects 118 in light of one or more suitable assessment parameters, e.g., in light of the respective detection moments or based on one or more estimated values with respect to the accuracy and/or reliability of the respective positions and/or orientations.

It is possible that first object data 206 are interpreted by a first interpretation module 216 of first version 111a, that is, evaluated with respect to their relevance for vehicle 100. In this instance, depending on an instantaneous situation of vehicle 100, first interpretation module 216 may select one or more relevant first objects 116' from first objects 116, for example, in FIG. 1, a preceding vehicle to the left of vehicle 100, and transmit appropriately filtered first object data 206' to assessment module 210.

Assessment module 210 may then link relevant first objects 116' to corresponding second objects 118 based, for example, on the respective positions and/or orientations and/or the respective detection moments. The assessment parameters of the objects linked to each other may subsequently be compared to each other in order to assess second version 111b. The interlinked objects may be objects which match up with each other in so far as they are object models of one and the same object which is actually present in the area surrounding vehicle 100.

Moreover, it is possible that second object data 208 are interpreted by a second interpretation module 218 of second version 111b, that is, are evaluated with respect to their relevance for vehicle 100. In this instance, depending on the instantaneous situation of vehicle 100, second interpretation module 218 may select one or more relevant second objects 118' from second objects 118, for example, in FIG. 1, a preceding vehicle to the right of vehicle 100, and transmit appropriately filtered second object data 208' to assessment module 210.

In this case, assessment module 210 may determine whether or not among relevant first objects 206' and relevant second objects 208', there are objects clearly matching up with each other. If one of relevant second objects 208' does not match up with one of relevant first objects 206', then for this second object, assessment module 210 may produce an individual assessment which indicates whether the detection of this second object represents an improvement or worsening of the detection quality of second version 111b compared to first version 111a. Assessment result 212 may then be produced based on the individual assessment.

The individual assessment may be produced based on sensor data 108. In this context, in addition to driving-environment data which were generated by one or more driving-environment sensors of vehicle 100, sensor data 108 may include driving-dynamics data which were generated by one or more driving-dynamics sensors of vehicle 100.

In the evaluation of sensor data 108 by assessment module 210, changes of the state of vehicle 100 in terms of driving dynamics that correlate timewise with the detection of relevant second objects 118' and are triggered, for instance, by a corresponding reaction of its driver, may be determined. On the basis of this change, it may finally be determined whether the detection of the object in question amounts to an improvement or worsening of the detection quality of second version 111*b*.

Alternatively, second interpretation module 218 may be configured to first of all determine those second objects 118 which do not clearly match up with any of relevant first objects 116', and subsequently to select relevant second objects 118' from them.

In addition, assessment module 210 may be configured to check second objects 118 for plausibility. For this purpose, assessment module 210 may evaluate second objects 118 on the basis of second object data 208 of multiple successive time steps. In this context, assessment result 212 may also be determined, taking into account the plausibility of second objects 118. An example for an implausible or inconsistent second object 118 is indicated in FIG. 1 with a dashed frame.

The assessment of second version 111*b* in the sense of a validation of a detection task which is to be accomplished with the aid of second detection module 204 and/or second interpretation module 218 may include, for example, the following steps.

First of all, it is checked whether relevant first objects 116', which were detected by first version 111*a*, were also detected in the same way or better by second version 111*b* running in shadow mode. In this context, the relevance of first objects 116 is not ascertained by first detection module 202 itself, but rather by first interpretation module 216, that is, by one or more following interpretive software elements in a kind of situation analysis. In order to determine which of second objects 118 correspond to relevant first objects 116', a logic operation is carried out in assessment module 210. On the basis of defined metrics which, for example, may include the respective detection moments or a confidence regarding the respective positions and/or orientations, the detection quality of the two versions 111*a*, 111*b* is then compared. If a worsening of the detection quality of second version 111*b* is determined, then a corresponding data sequence may be transmitted directly to central data-processing device 214. In this instance, the data sequence may be generated from corresponding sensor data 108 and/or corresponding object data 116 and 118, respectively. Conversely, an improvement of the detection quality may be confirmed by non-arrival of such data sequences at central data-processing device 214. Additionally or alternatively, the improvement or worsening of the detection quality may be determined by transmitting a bundled set of statistics at regular intervals from control unit 102 to central data-processing device 214.

Secondly, for each second object 118 which was detected by second version 111*b* but which cannot be linked to one of relevant first objects 116', its relevance for vehicle 100 is determined and an assessment is carried out which indicates whether the detection quality has worsened or improved by detection of this second object. If, in a kind of situation analysis, second interpretation module 218 has ascertained a relevant second object 118' which cannot be linked to any of relevant first objects 116', then first of all, using defined logics, e.g., on the basis of the reaction of the driver to this object, it is ascertained whether the detection of this object represents an improvement or worsening of the detection quality. Depending on logic, the process may be recorded in a set of statistics. Additionally or alternatively, the direct sending of a corresponding data sequence for the external evaluation in central data-processing device 214 may be triggered.

Thirdly, it is checked whether second objects 118 and/or relevant second objects 118' are consistent and plausible over time. For that, with the aid of time characteristics, assessment module 210 detects inconsistencies from sensor data 108 and/or second object data 208 and 208', respectively, for instance, second objects 118 suddenly appearing or suddenly disappearing in the immediate vicinity of vehicle 100. Information about these objects may be transmitted either directly in the form of a corresponding data sequence or bundled in the form of a set of statistics from control unit 102 to data-processing device 214.

The validation of a classification task may be carried out in analogous manner.

Finally, it should be pointed out that terms such as "having," "including," etc. do not rule out other elements or steps, and terms such as "one" or "a" do not exclude a plurality. Reference numerals are not to be regarded as restriction.

What is claimed is:

1. A method for assessing a software for a control unit of a vehicle, the control unit including memory in which a first version of the software and a second version of the software are stored, and a processor for running the first version and the second version, the method comprising the following steps:

receiving, in the control unit, sensor data generated by a sensor system for sensing an area surrounding the vehicle;

inputting the sensor data into the first version and the second version;

generating first object data from the sensor data by the first version, the first object data including positions and/or orientations of first objects, detected by the first version, in the area surrounding the vehicle;

generating second object data from the sensor data by the second version, the second object data including positions and/or orientations of second objects, detected by the second version, in the area surrounding the vehicle;

assessing the second version in terms of a detection quality by comparing the first object data to the second object data, to produce an assessment result; and transmitting the assessment result from the control unit to a central data-processing device.

2. The method as recited in claim 1, wherein:

for each first object of the first objects, at least one first assessment parameter is determined which indicates how well the first object was detected by the first version;

for each second object of the second objects, at least one second assessment parameter is determined which indicates how well the second object was detected by the second version;

wherein the second version is assessed by comparing the first assessment parameters to the second assessment parameters.

3. The method as recited in claim 2, wherein: i) the first assessment parameter is a detection moment at which the first object was detected by the first version, and/or ii) the second assessment parameter is a detection moment at which the second object was detected by the second version.

4. The method as recited in claim 2, wherein: i) the first assessment parameter is a probability with respect to the position and/or orientation of the first object, and/or ii) the second assessment parameter is a probability with respect to the position and/or orientation of the second object.

5. The method as recited in claim 2, wherein first objects relevant for the vehicle are selected from the first objects by the first version; objects matching up with each other being determined by comparing the relevant first objects to the second objects; and wherein the assessment parameters of the objects matching up with each other are compared to each other.

6. The method as recited in claim 5, wherein second objects relevant for the vehicle are selected by the second version from the second objects which do not match up with any relevant first object; for each relevant second object, an individual assessment is produced which indicates whether the detection of the relevant second object by the second version reflects an improvement or worsening of the detection quality of the second version compared to the first version; and the second version is further assessed based on the individual assessments.

7. The method as recited in claim 6, wherein based on the sensor data and/or on driving-dynamics data which were generated by at least one driving-dynamics sensor of the vehicle, changes in a driving state of the vehicle are determined which correlate timewise with detection moments at which the relevant second objects were detected by the second version; each individual assessment is produced by evaluating the change in the driving state correlating timewise with the respective relevant second object.

8. The method as recited in claim 1, wherein the second object data are generated in multiple successive time steps; the second objects are checked for plausibility by comparisons between the second object data from different time steps; and the second version is further assessed depending on the plausibility of the second objects.

9. The method as recited in claim 1, wherein the assessment result includes data sequences from the sensor data, from the first object data and/or from the second object data.

10. The method as recited in claim 9, wherein the data sequences are transmitted only when the second version was assessed to be worse than the first version in terms of the detection quality.

11. A control unit of a vehicle, comprising:
a processor configured to assess a software for the control unit; and
memory in which a first version of the software and a second version of the software are stored, wherein the processor is configured to run the first version and the second version, the processor configured to:
receive, in the control unit, sensor data generated by a sensor system for sensing an area surrounding the vehicle;
input the sensor data into the first version and the second version;
generate first object data from the sensor data by the first version, the first object data including positions and/or orientations of first objects, detected by the first version, in the area surrounding the vehicle;
generate second object data from the sensor data by the second version, the second object data including positions and/or orientations of second objects, detected by the second version, in the area surrounding the vehicle;
assess the second version in terms of a detection quality by comparing the first object data to the second object data, to produce an assessment result; and
transmit the assessment result from the control unit to a central data-processing device.

12. A non-transitory machine-readable storage medium on which is stored a computer program for assessing a software for a control unit of a vehicle, the control unit including memory in which a first version of the software and a second version of the software are stored, and a processor for running the first version and the second version, the computer program, when executed by the processor, causing the processor to perform the following steps:
receiving, in the control unit, sensor data generated by a sensor system for sensing an area surrounding the vehicle;
inputting the sensor data into the first version and the second version;
generating first object data from the sensor data by the first version, the first object data including positions and/or orientations of first objects, detected by the first version, in the area surrounding the vehicle;
generating second object data from the sensor data by the second version, the second object data including positions and/or orientations of second objects, detected by the second version, in the area surrounding the vehicle;
assessing the second version in terms of a detection quality by comparing the first object data to the second object data, to produce an assessment result; and
transmitting the assessment result from the control unit to a central data-processing device.

\* \* \* \* \*